March 5, 1963
M. L. McNAIR
3,080,004
CULTIVATOR
Filed May 24, 1962
3 Sheets-Sheet 1
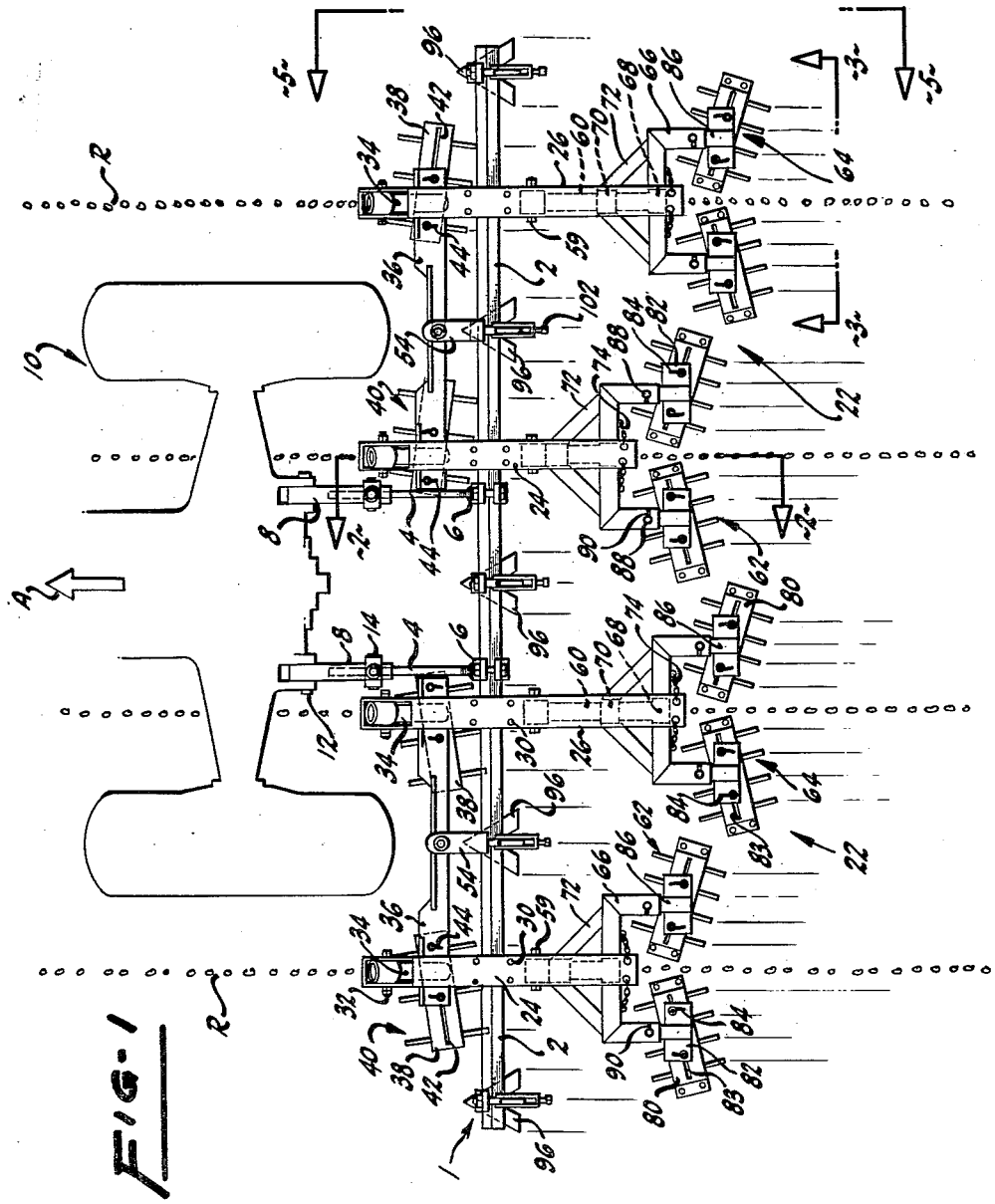
INVENTOR.
MELVIN L. McNAIR
BY Edward B. Gragg
Melvin R. Stidham
ATTORNEYS March 5, 1963 M. L. McNAIR 3,080,004
CULTIVATOR
Filed May 24, 1962 3 Sheets-Sheet 2
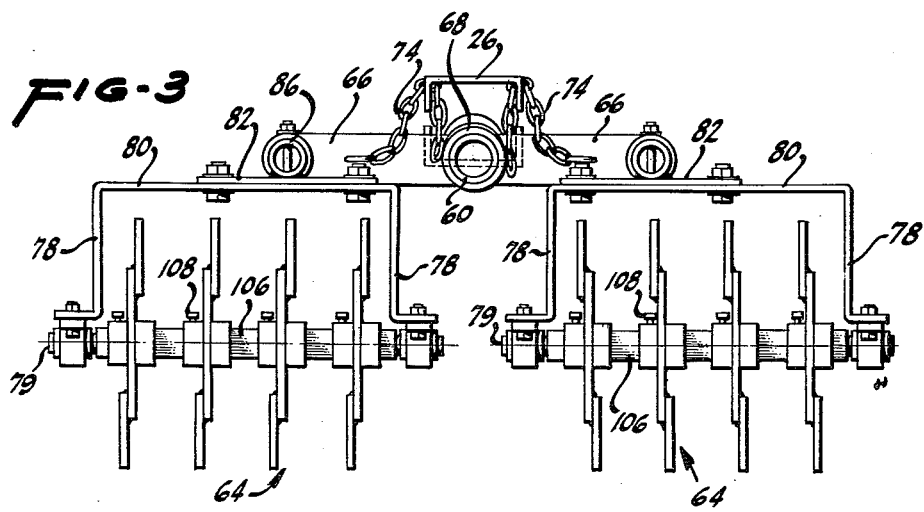
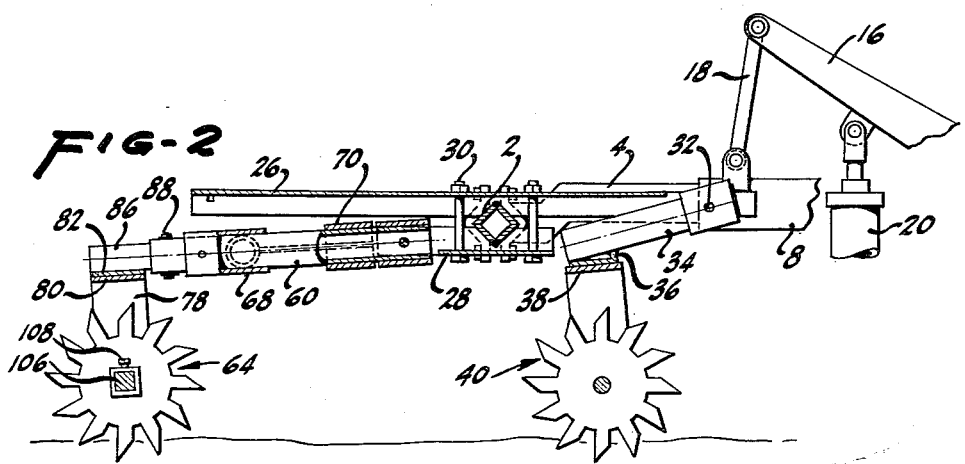
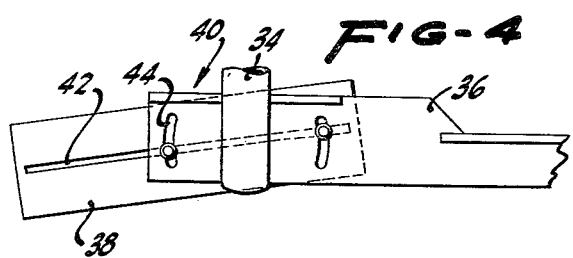
INVENTOR.
MELVIN L. McNAIR
BY Edward B. Gregg
Melvin R. Stidham
ATTORNEYS

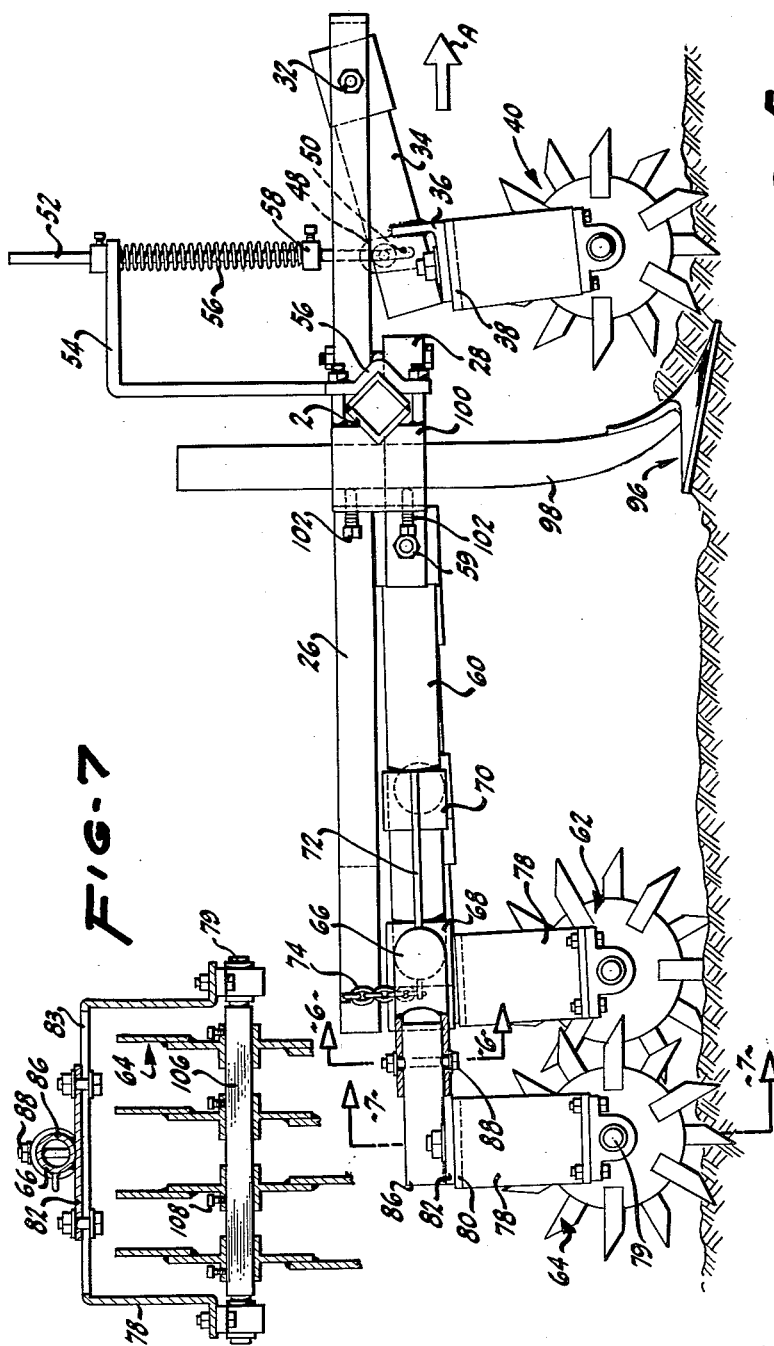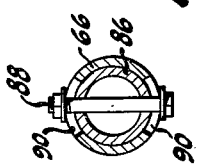

3,080,004
CULTIVATOR
Melvin L. McNair, P.O. Box 436, Driscoll, Tex.
Filed May 24, 1962, Ser. No. 197,299
7 Claims. (Cl. 172—587)

This invention relates to a cultivator and, more particularly to an apparatus including an array of rotary cultivator gangs for cultivating more than one row of crops simultaneously.

Cultivators presently aavilable comprise a plurality of rotary hoe gangs mounted along the width of a frame with, perhaps, some limited adjustment for laterally spacing the rotary gangs. Previously I conceived the idea of adjusting the angle of attack of the rotary hoes in order to vary the amount of work done thereby, but the agricultural industry continues to seek a cultivator with greater versatility in adjustment and operation.

It is, therefore, an object of this invention to provide a cultivator including means for providing fine adjustment of lateral spacing according to row spacing.

It is a further object of this invention to provide a cultivator including gangs of rotary hoes which may be adjusted both laterally for row spacing and about vertical axes for adjustment of the angle of attack.

It is a further object of this invention to provide a cultivator having front gangs of rotary hoes which may be closely adjusted to work along the tops of the rows of crops, and rear gangs of rotary hoes which may be adjusted laterally to straddle the crop rows as closely as desired.

It is a further object of this invention to provide pairs of rotary hoe gangs which may be adjusted to straddle a row of crops to work on opposite sides thereof and which are free to move vertically relative to each in order to compensate for variances in surface level on opposite sides of the row.

It is a further object of this invention to provide pairs of rotary hoe gangs adapted to work on opposite sides of row crops which gangs may be adjusted about a horizontal axis according to the slope on opposite sides of the row, and laterally so that they may be spaced as closely as desired on opposite sides of the row.

It is a further object of this invention to provide a cultivator which is of simple construction and easy to apply to conventional farm equipment.

In carrying out this invention, I provide a conventional tool bar on which the arrays of rotary hoe gangs are mounted. Each array comprises a pair of fore and aft support beams to the forward and mid portions of which are pivotally mounted front and rear downwardly and rearwardly extending arms. Extending between the two front arms is a transverse mounting member on the ends of which are secured a laterally spaced pair of front rotary hoe gangs. A longitudinal slot on each gang mounting bracket permits close adjustment of lateral spacing, and arcuate slots in the transverse mounting member permits adjustment of the angle of attack. To each rearwardly extending arm is rotatably connected a rearwardly extending U-shaped member on each leg of which is mounted a gang of rotary hoes. That is, for each forward rotary hoe which is spaced to engage the row of crops itself, a pair of rear rotary hoes extends to operate on each side of the crop row. Longitudinal and arcuate slot means provide for adjustment of the lateral spacing of each pair of rotary hoe gangs and for individual adjustment of the angles of attack. Additionally, the rotary hoe mounting bracket is carried in the legs of the U-shaped member in a collar so that the angle of the rotary hoe axle may be adjusted with respect to a horizontal plane. Additionally, the limited rotation provided by the mounting of the U-shaped member on the rear arm permits the rear rotary assemblies to move up or down relative to each other in accordance with surface differential on opposite sides of the row.

These and other objects and advantages of this invention will become apparent from the specification following when read in conjunction with the accompanying drawings wherein:

FIG. 1 is a top plan view of the cultivator showing its attachment to a tractor;
FIG. 2 is a section view taken along line 2—2 of FIG. 1;
FIG. 3 is a rear view taken along line 3—3 of FIG. 1;
FIG. 4 is a partial view of a front rotary hoe mounting;
FIG. 5 is an end view taken along line 5—5 of FIG. 1 and
FIGS. 6 and 7 are section views taken along lines 6—6 and 7—7, respectively, of FIG. 5.

Referring now to the drawings, the cultivator of this invention 1 is mounted on a main frame member or tool bar 2. The tool bar 2 may be of conventional structure formed essentially as a box beam carried on support arms 4 by means of suitable clamps 6. When the support arms 4 are disposed horizontally by connecting them with suitable male coupling elements 8 on a tractor 10, the box beam main frame member is disposed as shown particularly in FIGS. 1 and 2 with diagonally opposed edges of the box beam disposed along the horizontal end vertical axes.

The female coupling element 8 on the tractor 10 is pivotally mounted at 12 and when the coupling is completed by suitable clamp means 14, the coupling elements 4 and 8 may be swung as a unit through a vertical arc in order to vary the height of the main frame tool bar 2 relative to any reference point on the tractor 10 and, hence, to the earth on which it is supported. This adjustment is accomplished by any suitable means such as an arm 16 pivoted on the tractor frame and connected to the female coupling element 8 by means of a link 18, the elevation of the arm 16 being controlled by a hydraulic ram 20 to fix the position of the main tool bar 2.

Mounted on the main tool bar 2 are a series of rotary hoe assemblies 22, two being shown in FIG. 1. Each rotary hoe assembly includes a pair of fore and aft support beams 24 and 26 which are preferably of channel construction notched to fit snugly over the tool bar 2. A bottom clamp member 28 (FIGS. 2 and 5) is also notched to embrace the underside of the tool bar 2 and each cross beam 24 and 26 is bolted securely to a bottom clamp member 28 by means of bolts 30. Thus, it is apparent that placement and tightening of just eight bolts, i.e. four on each beam 24 and 26 will position a complete rotary assembly 22 on the tool bar.

Pivotally mounted at 32 to the front end of each support beam 24 and 26 is an arm 34 which may, if desired, be formed of suitable iron pipe. Each of the rearwardly and downwardly extending arms 34 is secured to one end of a transverse mounting bar 36 which extends between the two arms 34 and carries adjacent each end thereof a downwardly directed U-shaped mounting bracket 38 between the legs of which a front gang of rotary hoes 40 is rotatably mounted at 39. Each rotary hoe is preferably formed of a disc 41 to which a series of radial spikes or prongs are welded or otherwise secured. Each mounting plate 38 has a longitudinal slot 42 therein as shown most clearly in FIG. 4, so that the spacing between rotary gangs may be adjusted in accordance with the spacing between crop rows R and the transverse support member has pairs of arcuate slots 44 therein so that the angular disposition of the rotary hoes 40 with respect to the direction of travel indicated by the arrow A can be adjusted (FIGS. 1 and 4). The transverse support member 36 is of sufficient length that, with the slots 42, the spacing of the forward rotary hoes 40 can be adjusted to accommodate a wide range of crop row spacing.

Referring now to FIG. 5, the cross member 36 which may be of angle iron, carries a bracket 48 intermediate its ends, and a slot 50 in the bracket is engaged by a rod 52 depending from a bracket 54 clamped onto the frame tool bar at 56. Thus, the hydraulic ram (FIG. 2) is adjusted to establish the normal height of the tool bar 2 and, hence, the normal penetration of the front rotary hoes 40. When the tool bar is in active position with the rotary hoes in engagement with the ground, the slot 50 will permit a limited amount of free movement of the cross member 36 so that the rotary hoes 40 may move upwardly and downwardly in unison to accommodate to irregularities in the surface along the rows R. A spring 56 extending between the bracket 54 and a collar 58 will absorb shocks resulting from impact of the rotary hoes with an obstacle, such as a sudden rise in the earth along the rows R. When the hydraulic ram is extended to elevate the rotary hoes above the ground the front pairs will be suspended from the rod 52.

Pivotally mounted at 59 near the mid-portion of each fore and aft support 24 and 26 is a downwardly and rearwardly extending arm 60 on which are supported a pair of rear gangs of rotary hoes 62 and 64. Thus, for each front gang of hoes which works over the crop row R there are two rear gangs which, as will be seen, work on each side of the row. Each rear gang of rotary hoes 62 and 64 is supported on a U-shaped pipe member 66 terminating in a central collar 68 rotatably carried on the pipe arm 69 (FIGS. 1 and 5). Preferably, a second collar 70, supported on cross members 72 which are welded or otherwise secured to the U-shaped member 66, is also pivotally mounted on the arm 60. As shown in FIGS. 1 and 3, chains or other suitable tension members 74 extend between each cross beam 24 and 26 and opposite sides of the U-shaped member 66 in order to permit a limited amount of rotary movement of the U-shaped members 66 about the axis of the pipe or cylindrical arm 60 by virtue of the rotary association of the collars 68 and 70, and further to limit pivotal movement of the arms 60. Thus, it is apparent that when the hydraulic ram 20 is extended to raise the tool bar to carry the rear rotary hoes 62 and 64 clear of the ground, the arm 60 will be suspended from the chains 74 or other tension members and that when the rear rotary hoes are placed on the ground, with some slack in the chains 74, the U-shaped member 66 may rotate a limited amount to permit differential elevation of the rotary hoes mounted on opposite legs thereof.

Each rotary hoe gang 62 or 64 is rotatably mounted between the downwardly depending legs 78 of a generally U-shaped frame 80. Each mounting bracket 80 is carried on a support plate 82 secured on opposite legs of the U-shaped pipe member 66. As in the case of the front rotary hoes, the mounting bracket 80 is longitudinally slotted at 83 (FIGS. 1 and 7) so that the rearward rotary hoes 62 or 64 may be displaced laterally over a wide range relative to the plant rows R. Similarly, the mounting plate 82 includes a pair of arcuate slots 84 which permit the adjustment of the angle of the rotary axis of the rear rotary hoes relative to the direction of movement A, i.e. to adjust the angle of attack. The mounting plate 82 may be secured as by welding onto a short length of pipe 86 which is inserted into the trailing open end of a leg of the U-shaped member 66 (FIGS. 2, 3, 5 and 6). A bolt 88 extends through the leg of the U-shaped member 66 and the short length of pipe 86 and one of the members, e.g. the U-shaped member 66 is slotted as at 90 (FIG. 6) so that the rotary hoes 62 and 64 may be angled to accommodate to the slope along the side of the crop rows.

From the foregoing it will be seen that each rotary assembly 22 includes a pivotally mounted transverse mounting member 36 which supports two pairs of forward rotary hoes 40 which by means of longitudinal slots 42 in their mounting brackets 38 may be adjusted in spacing to accommodate to the spacing between crop rows. Additionally, because of the arcuate slots in the transverse support members 36, the forward rotary hoes 40 may be adjusted in angle of attack to vary the amount of work done thereby. In association with each of the forward rotary hoes 40 is a pair of rearward rotary hoe gangs 62 or 64, the mounting brackets of which are longitudinally slotted so that the spacing of the gangs may be adjusted to closely embrace the crop row R. Additionally, arcuate slots 84 are provided so that the angle of attack may be varied, and because of the slotted connection 90 (FIG. 6) between the inter-fitting cylindrical members, the rotary hoes may be adjusted about a forwardly extending horizontal axis to accommodate to the slope along the sides of the crop rows R and the whole unit is rotatably floated within limits to accommodate to irregularities in the row wherein one side is at a different elevation than the other.

In addition to the rotary hoes, I may provide a series of foot pieces 96 mounted on shanks 98 which, in turn are carried in brackets 100 secured onto the tool bar 2 (FIG. 5). An upper and lower pair of set screws 102 can be threaded inward differentially in order to adjust the angle of the shank 98 and, hence, the angle of attack of the foot piece 96. It is to be noted that the foot pieces are mounted in front of the rearward rotary hoes so that large clods plowed up by the foot pieces are pulverized by the trailing rotary hoes.

Referring now to FIGS. 3 and 7, I have shown the preferred structure of the rotary hoe gangs used throughout. The rotary hoes (shown in these views of rear hoes 64) are secured onto a shaft 106 to rotate in unison therewith. Preferably the shaft 106 is of square cross section and set screws 108 permit the rotary hoes 64 to be positioned along the shaft as desired and secured into place.

While in the embodiment here shown, the tool bar is maintained at desired elevation by the hydraulic jack 20 and linkage on the tractor, it is anticipated that gauge wheels may be provided to support the tool bar and cultivator for use with other hitching devices.

While a preferred embodiment of this invention has been illustrated and described, it is apparent that modifications and changes therein may be made by those skilled in the art without departing from the spirit and scope of this invention which is defined by the claims appended hereto.

What is claimed as my invention is:

1. A cultivator comprising:
   a horizontal frame,
   at least one elongated support member mounted on said frame to extend in the direction of frame movement,
   means mounting said support member for lateral adjustment on said frame,
   a first arm pivotally mounted at the forward end of said support member to swing through the vertical plane thereof,
   a second arm pivotally mounted on said support member rearward of said first arm to swing through said vertical plane,
   a first gang of rotary hoes carried on the free end of said first arm to engage the top of a row of crops,
   a sub-frame carried on the free end of said second arm to extend laterally on opposite sides thereof, and
   a spaced pair of trailing rotary hoes carried on said sub-frame on opposite sides of said second arm to engage the sides of said row of crops.

2. The cultivator defined in claim 1 wherein:
   said sub-frame is of generally U-shaped configuration with the legs thereof extending rearwardly on opposite sides of said second arm, each of said pair of trailing rotary gangs being carried on one leg of said sub-frame, means mounting said sub-frame on said second arm for limited rotary movement about the longitudinal axis thereof, said limited rotary movement enabling said sub-frame to adjust to surface differential between opposite sides of a row of crops.

3. The cultivator defined in claim 2 including, means for adjusting the rotary axis of each of said rotary gangs with respect to the direction of frame movement.

4. A cultivator comprising:

a horizontal frame, a pair of support members mounted on said frame to extend in the direction of frame movement, means mounting said support members for lateral position adjustment on said frame, a first arm pivotally mounted at the forward end of each of said support members to pivot in the vertical plane thereof, a transverse member interconnecting said first arms so that they pivot in unison, said transverse member being of a length so that said first arms are spaced substantially in accordance with standard crop row spacing, a forward pair of rotary hoe gangs carried at opposite ends of said transverse member, a second arm pivotally mounted on each of said support members rearward of said first arm to pivot in said vertical plane thereof, a sub-frame carried on the free end of said second arm to extend laterally on opposite sides thereof, and a spaced pair of trailing rotary gangs carried on said sub-frame on opposite sides of said second arm.

5. The cultivator defined in claim 4 including:

mounting means for adjustably securing each of said rotary hoe gangs in a selected location within a limited range laterally of said plane of the corresponding one of said first arms and in a predetermined angle with respect thereto.

6. The cultivator defined in claim 4 wherein:

said sub-frame is of generally U-shaped configuration with the legs thereof extending rearwardly on opposite sides of said second arm, each of said pair of trailing rotary gangs being carried on one leg of said sub-frame, means mounting said sub-frame on said second arm for limited rotary movement about the longitudinal axis thereof, said limited rotary movement enabling said sub-frame to adjust to surface differential between opposite sides of a row of crops.

7. A cultivator comprising:

a horizontal frame, support members mounted on said frame to extend in the direction of frame movement, means mounting said support members for lateral position adjustment on said frame, a pair of first arms pivotally mounted to the forward end of said support members to pivot in a vertical plane in the direction of frame movement, a transverse member interconnecting said first arms so that they pivot in unison, said transverse member being of a length so that said first arms are spaced substantially in accordance with standard crop row spacing, a forward pair of rotary hoe gangs carried at opposite ends of said transverse member, a second arm pivotally mounted on said support members rearward of each of said first arms to pivot in said vertical plane, a sub-frame carried on the free end of each of said second arms to extend laterally on opposite sides thereof, and a spaced pair of trailing rotary gangs carried on said sub-frame on opposite sides of said second arm.

References Cited in the file of this patent

UNITED STATES PATENTS

| | | |
|---|---|---|
| 204,793 | Bramer | June 11, 1878 |
| 591,484 | Miller | Oct. 12, 1897 |
| 925,926 | Lindgren | June 22, 1909 |
| 1,249,008 | Bonds | Dec. 4, 1917 |
| 1,616,886 | Chase et al. | Feb. 8, 1927 |
| 2,191,537 | Miller | Feb. 27, 1940 |
| 2,539,632 | Miller | Jan. 30, 1951 |
| 2,572,202 | Rowland | Oct. 23, 1951 |
| 2,947,372 | Olson | Aug. 2, 1960 |
| 2,994,387 | Lehman et al. | Aug. 1, 1961 |